US012312960B1

(12) United States Patent
Al-Subaih

(10) Patent No.: US 12,312,960 B1
(45) Date of Patent: May 27, 2025

(54) INTEGRATED INTERNAL CONTINUOUS COMBUSTION ROTARY ENGINE

(71) Applicant: Adel Al-Subaih, Kaifan (KW)

(72) Inventor: Adel Al-Subaih, Kaifan (KW)

( * ) Notice: Subject to any disclaimer, the term of this patent is extended or adjusted under 35 U.S.C. 154(b) by 0 days.

(21) Appl. No.: 18/818,659

(22) Filed: Aug. 29, 2024

(51) Int. Cl.

| | |
|---|---|
| ***F01C 1/344*** | (2006.01) |
| ***F01C 1/063*** | (2006.01) |
| ***F01C 1/07*** | (2006.01) |
| ***F01C 19/02*** | (2006.01) |
| ***F02B 53/04*** | (2006.01) |
| ***F02B 53/08*** | (2006.01) |
| ***F02B 55/02*** | (2006.01) |
| ***F04C 18/32*** | (2006.01) |

(52) U.S. Cl.
CPC .............. *F01C 1/344* (2013.01); *F01C 1/063* (2013.01); *F01C 1/07* (2013.01); *F01C 19/02* (2013.01); *F02B 53/04* (2013.01); *F02B 53/08* (2013.01); *F02B 55/02* (2013.01); *F04C 18/321* (2013.01)

(58) Field of Classification Search
CPC .. F01C 1/063; F01C 1/07; F01C 1/344; F01C 19/02; F02B 53/04; F02B 53/08; F02B 55/02; F04C 18/321
See application file for complete search history.

(56) References Cited

U.S. PATENT DOCUMENTS 3,320,898 A * 5/1967 Eickmann .............. B64D 31/14 418/61.1
3,765,379 A * 10/1973 Thomas .................... F01C 1/44 123/243

* cited by examiner

*Primary Examiner* — Audrey B. Walter
(74) *Attorney, Agent, or Firm* — Sam Pierce

(57) ABSTRACT

An integrated rotary expansible chamber device comprises a compressor and a pneumatic motor housed within a single engine block. The pneumatic motor includes a cylindrical casing having a pressurized gas inlet, an exhaust outlet, and an off-center output shaft with a rotor mounted on it. The rotor have spring-loaded radially sliding vanes. The vanes sealed with the casing wall by pivoted shoes. The pneumatic motor powers the compressor, supplying compressed air to a combustion chamber, which produces pressurized combustion gases to drive the pneumatic motor. The device incorporates a recess for gradual (extended) exhaust gas release, air and fuel storage tanks for rapid starting without a starter motor. In another embodiment, the pneumatic motor consists of cylindrical casing with centrally meshed radial vanes mounted on coaxial shafts, driven by inverted crank slider mechanism in the adjacent drive box. This embodiment feature labyrinth sealing for oil-free operation and versatile functionality.

8 Claims, 11 Drawing Sheets

Vane rotary type motor, assembly view of the pneumatic motor with three vanes showing all internal parts.

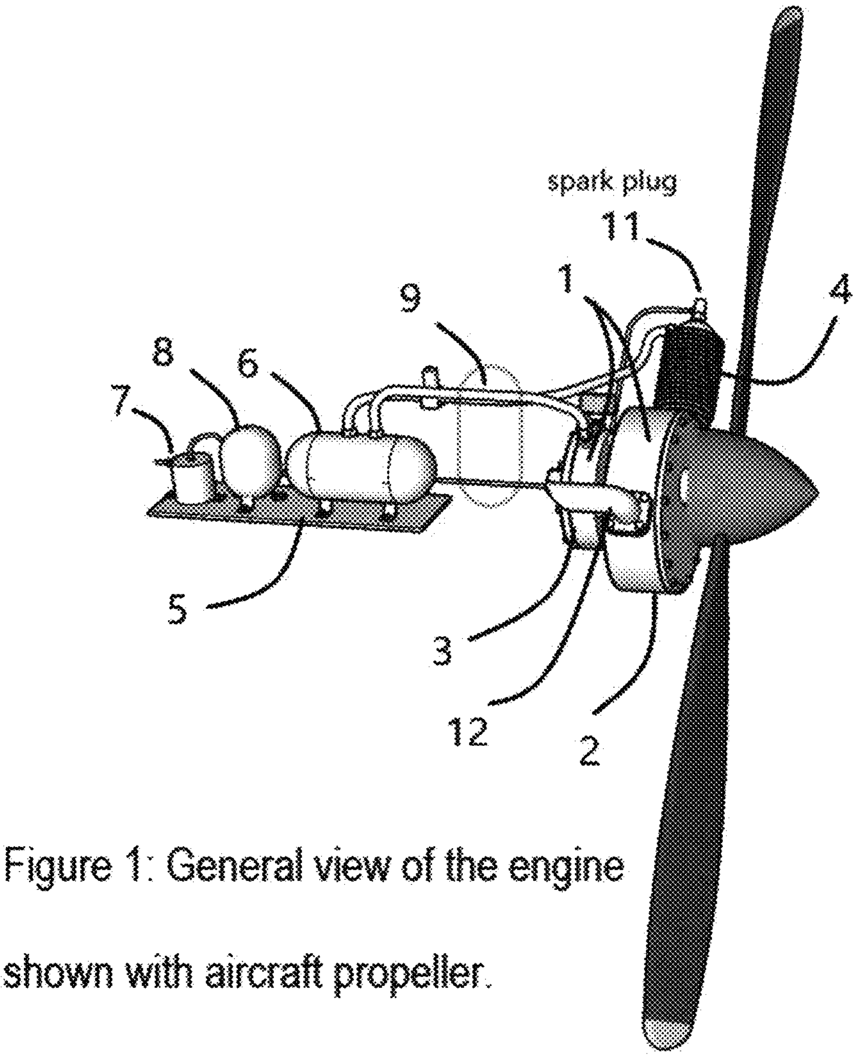
Figure 1: General view of the engine shown with aircraft propeller.

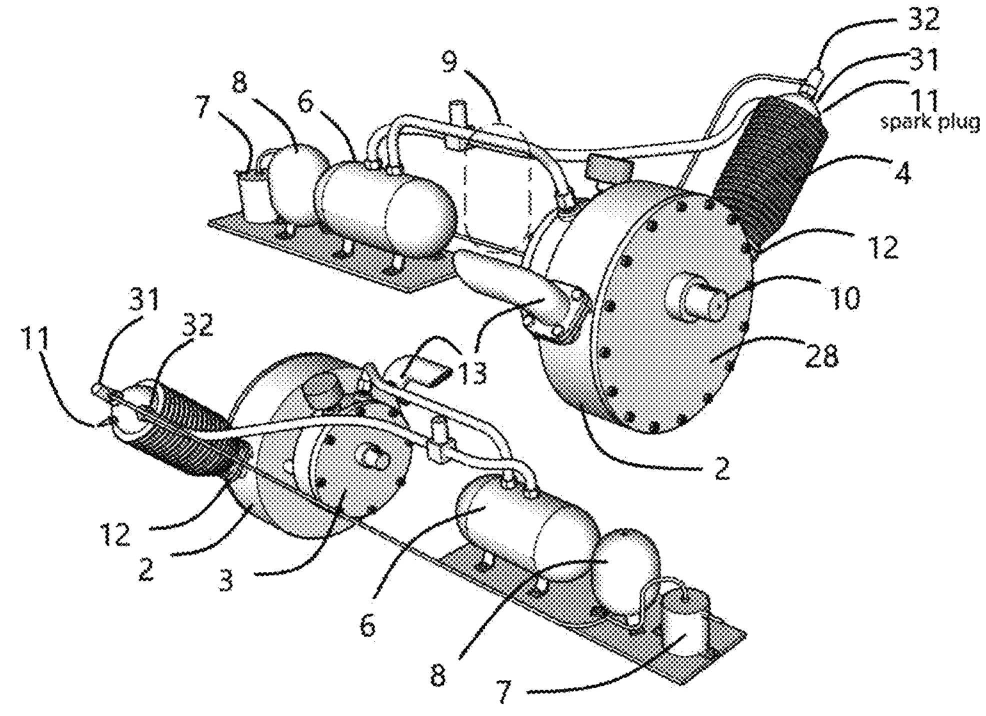
Figure 2: Vane rotary type motor block with remote auxiliary equipment, front and back views.

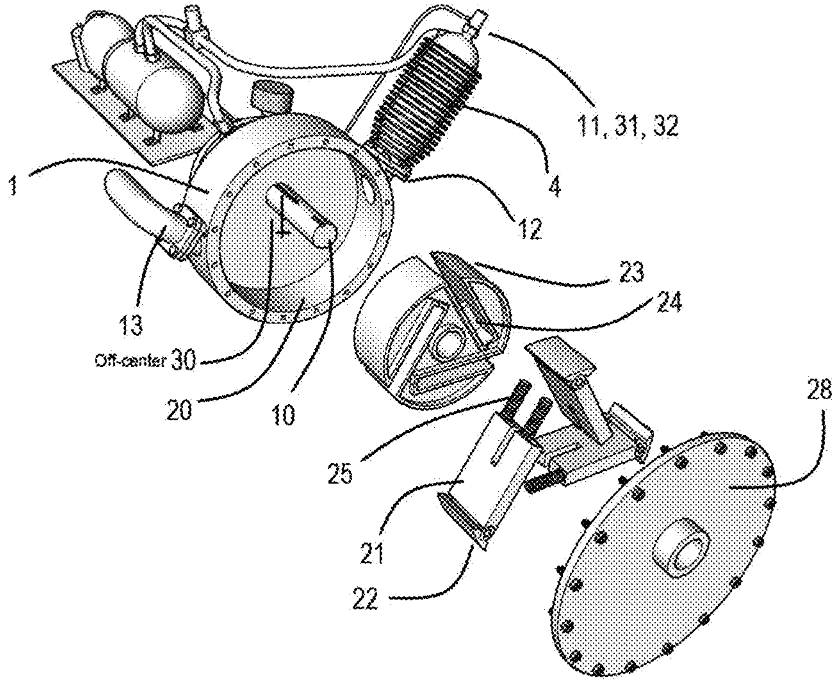
Figure 3: Vane rotary type motor, assembly view of the pneumatic motor with three vanes showing all internal parts.

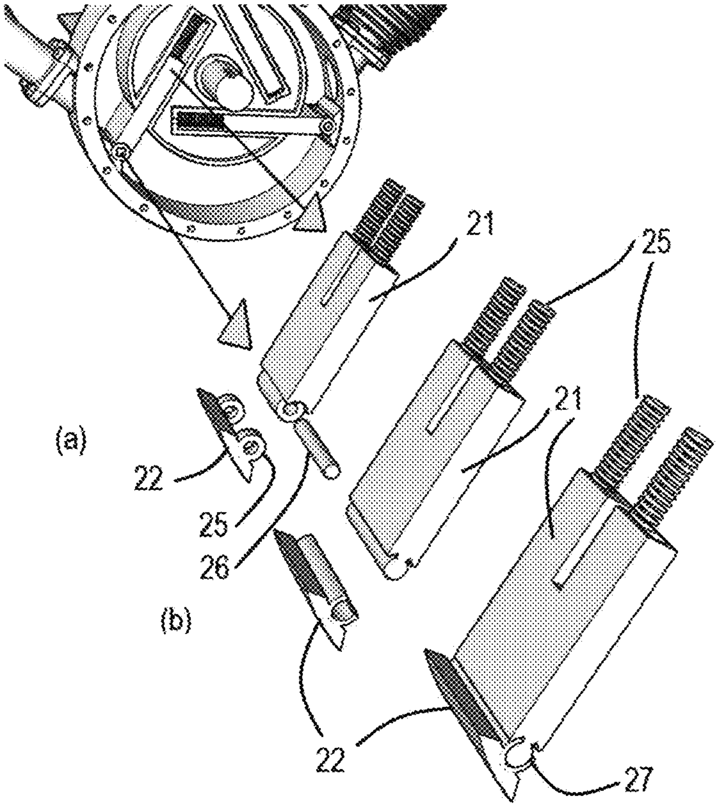
Figure 4: Vane embodiments for rotary type motor a) hinged shoe and b) profiled pivoted shoe.

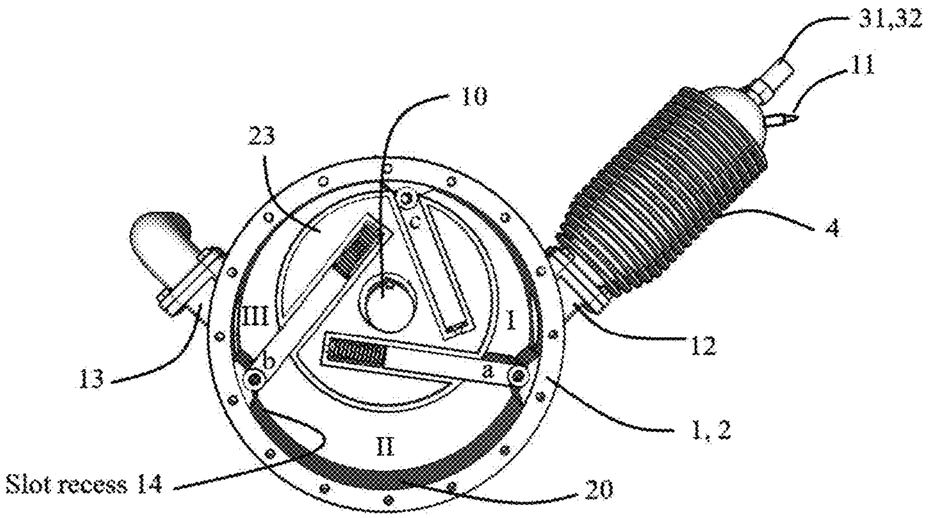
Figure 5: Vane rotary type motor, engine operation view with three vanes.

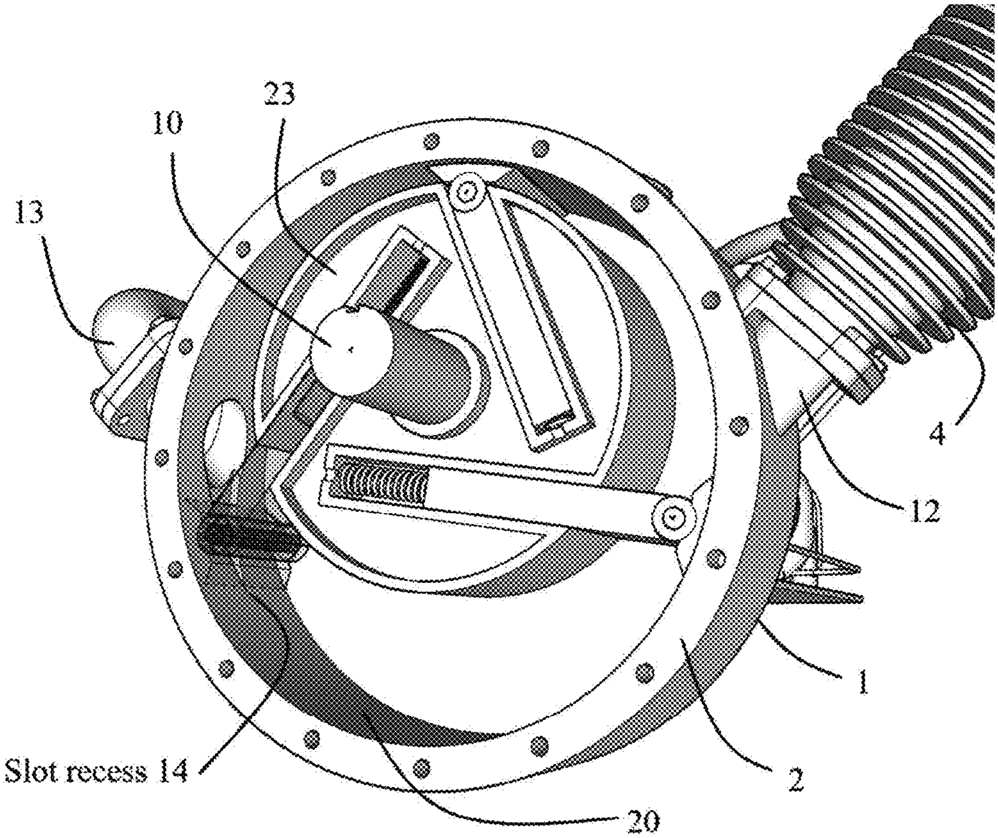
Figure 6: Vane rotary type motor casing showing the gradual discharge recess near the exhaust port, vane drawn transparent.

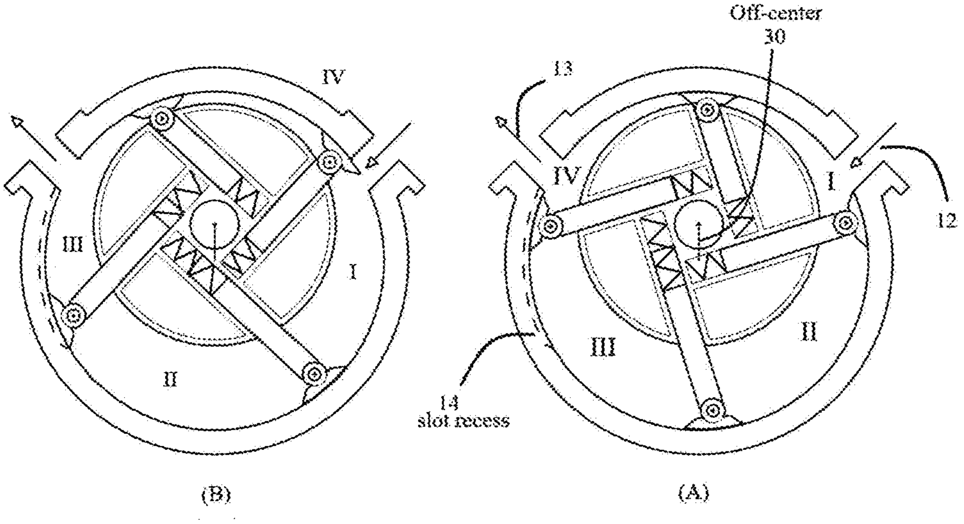
Figure 7: Vane rotary type motor, engine operation view with four vanes in progressive positions.

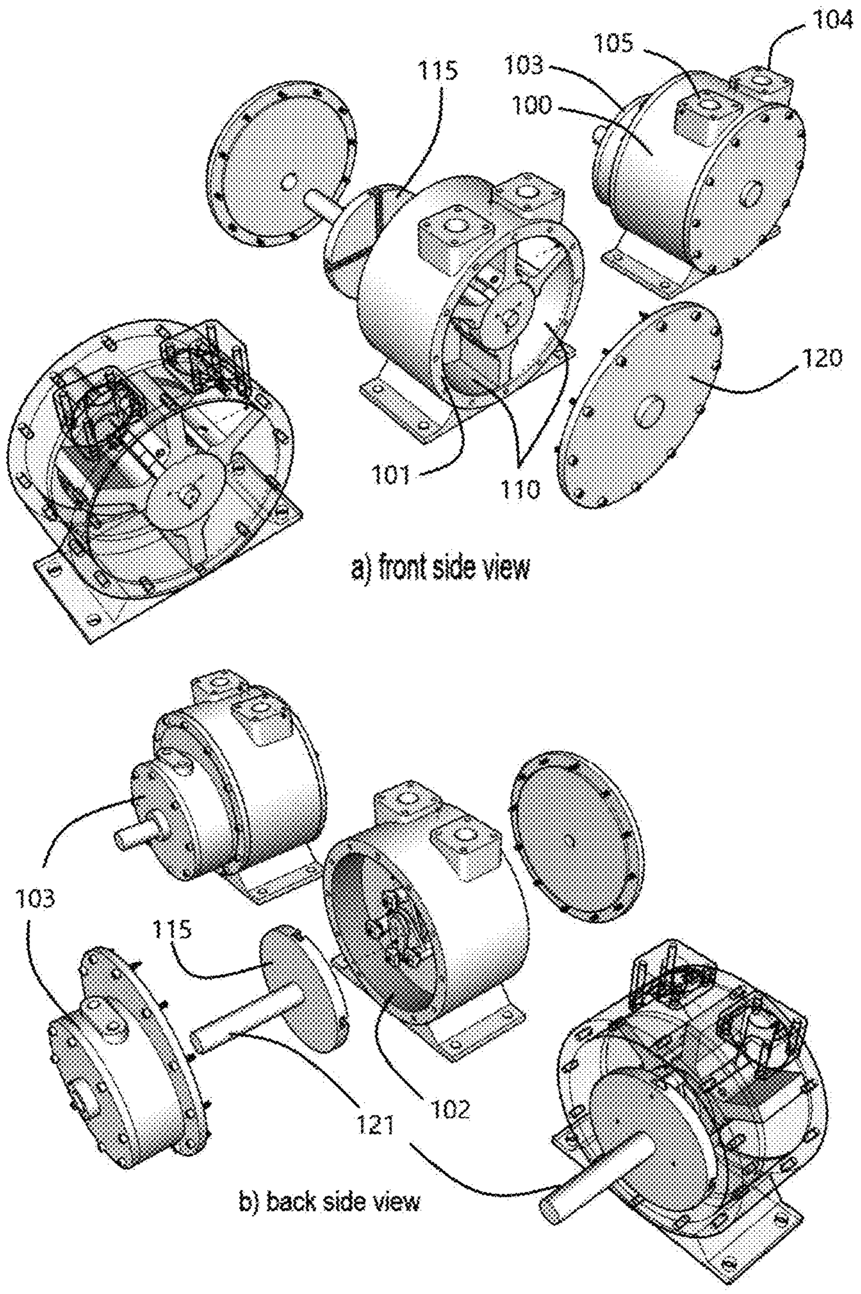
Figure 8: coaxial radial vane type engine, a) front side view b) back side view.

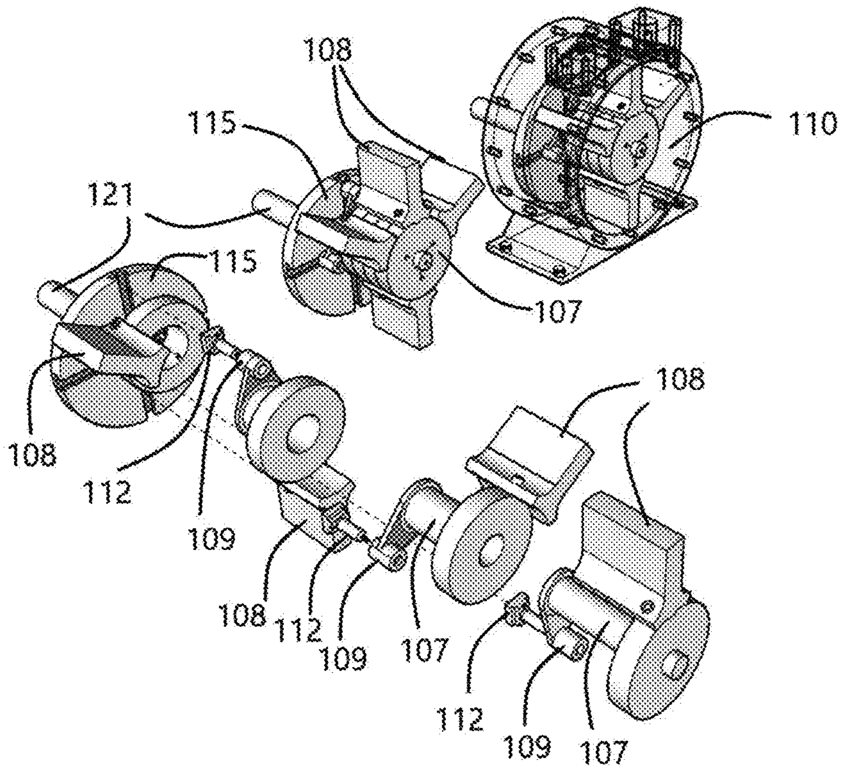
Figure 9: coaxial radial vane type motor, assembly view with four vanes.

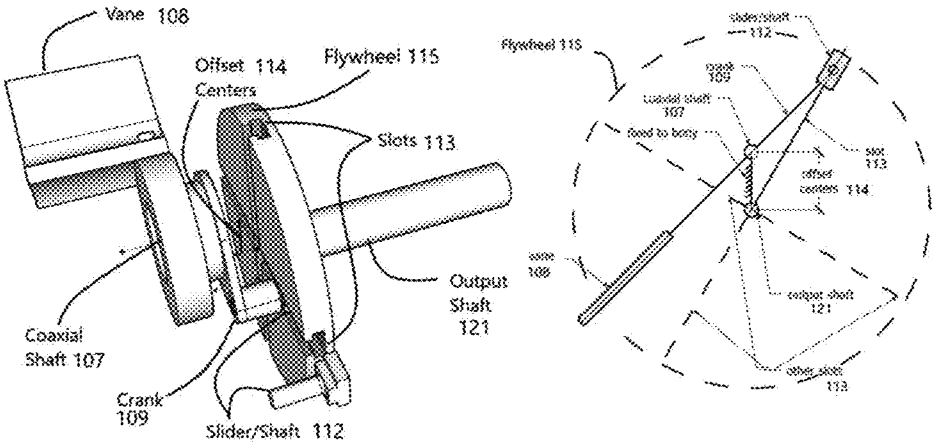
a) isolated single vane with slider block.
b) equivalent schematic drawing of the crank slider mechanism.
Figure 10: coaxial radial vane type motor, single vane with inverted crank/slider mechanism.
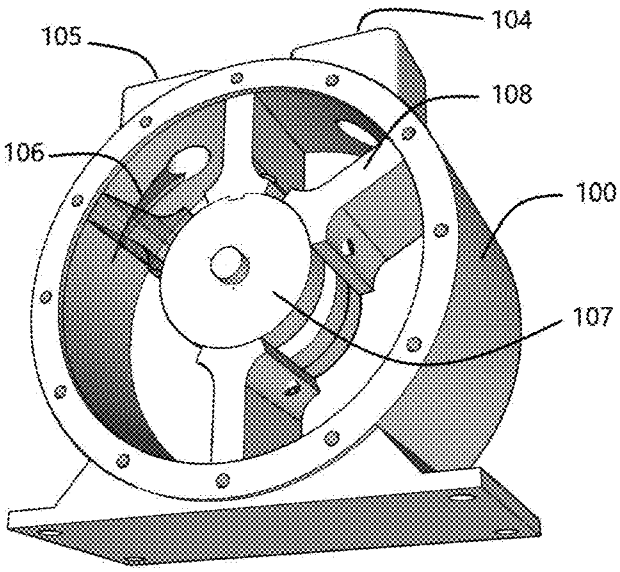
Figure 11: coaxial radial vane type motor gradual discharge recess near the exhaust port. Vane drawn transparent.

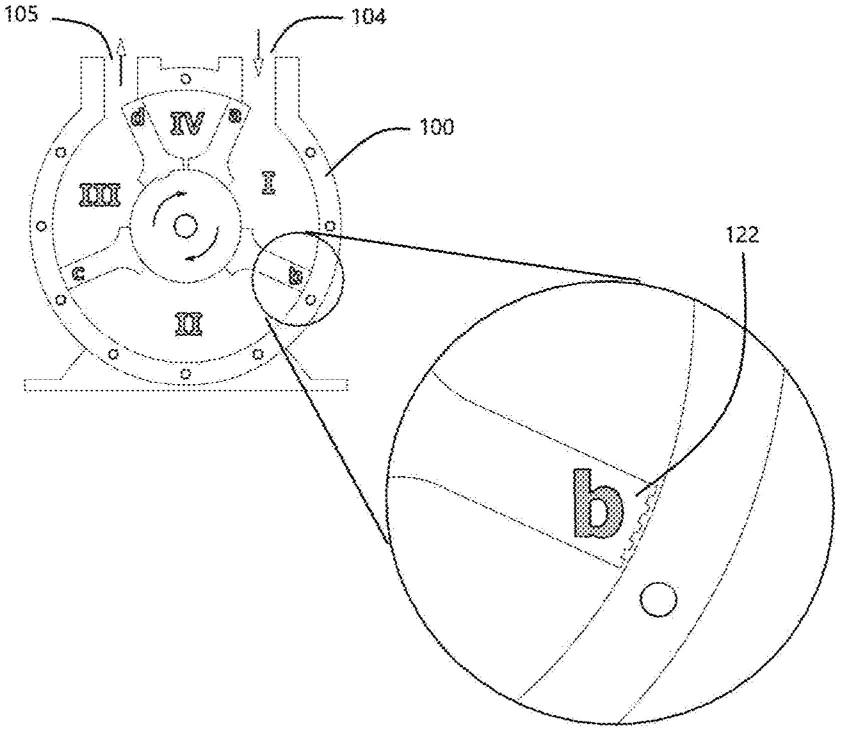
Figure 12: coaxial radial vane type motor with labyrinth no-contact seal clearance with the casing.
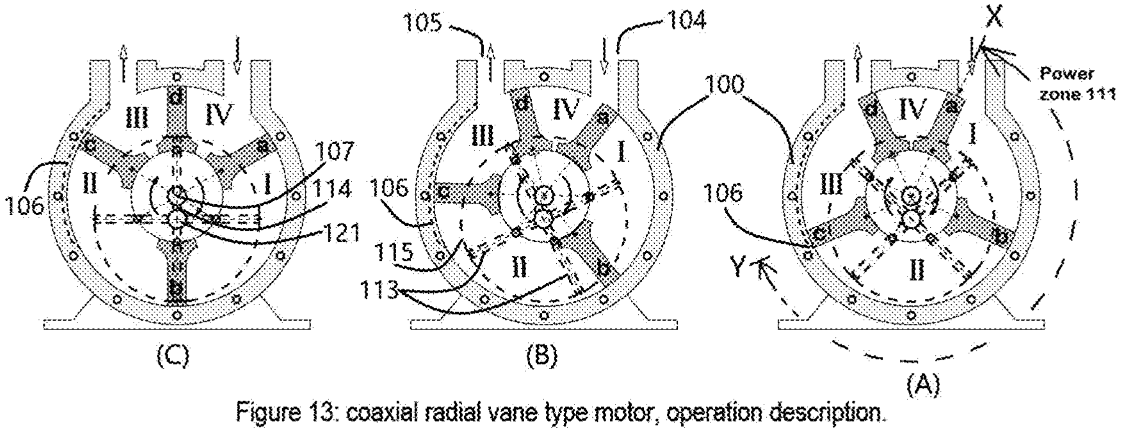
Figure 13: coaxial radial vane type motor, operation description.

INTEGRATED INTERNAL CONTINUOUS COMBUSTION ROTARY ENGINE

BACKGROUND

Field of Invention

The present invention relates generally to the field of internal combustion engines. More specifically, the invention pertains to rotary configurations that enable continuous combustion processes.

Description of Prior Art

Internal combustion engines broadly categorized into two main types: intermittent combustion engines and continuous combustion engines. Intermittent combustion engines operate by igniting a specific quantity of fuel-air mixture within an enclosed chamber, generating high-pressure gases that drive the engine components. These engines may utilize reciprocating pistons or adopt rotary configurations, as exemplified by conventional gasoline and diesel engines, piston or rotary.

In contrast, continuous combustion engines facilitate an ongoing combustion process through a stabilized flow of pressurized fuel and air within a combustion chamber. The resulting high-pressure combustion gases drive a motor, which in turn powers a compressor to supply pressurized air and maintain the continuous combustion process. Gas turbines, which employ axial flow compressors and turbines, are a well-known example of this technology.

The present invention introduces an Integrated Internal Continuous Combustion Rotary Engine (IICC Engine). The primary components of this engine include a mechanical compressor, combustion chamber, and pneumatic motor. The pneumatic motor's mechanical output drives the compressor, ensuring a continuous supply of compressed air to the combustion chamber. Additional elements such as an intermediate air tank, fuel pump, fuel pressure tank, injectors, spark plug, and various controls are incorporated to support and optimize the engine's continuous operation.

Various designs for internal continuous combustion engines have been disclosed in the prior art, featuring different types of mechanical compressors and motors. For instance, U.S. Pat. No. 2,476,397 by Bary (1949) introduced the concept of an internal continuous combustion engine with a rotary compressor, combustion chamber, and rotary drive housed in a non-circular casing with radial vanes.

U.S. Pat. No. 2,688,230 by Milliken (1954) describes an internal continuous combustion engine incorporating a reciprocating piston compressor, combustion chamber, and reciprocating piston drive with a crankshaft.

U.S. Pat. No. 3,057,157 by Close (1962) presents an internal continuous combustion engine featuring an oval rotary vane compressor and drive combination within a single casing, connected to a combustion chamber.

U.S. Pat. No. 3,886,734 by Johnson (1975) presented an internal continuous combustion engine with several embodiments, including reciprocating piston and rotary configurations.

U.S. Pat. No. 3,996,899 by Partner et al. (1976) introduces an inline compressor, combustion chamber, and drive housed within a single casing, featuring lobe-type compressor and drive components.

U.S. Pat. No. 4,854,279 by Seno (1989) describes an internal continuous combustion engine similar to U.S. Pat. No. 3,057,157 by Close, comprising a rotary vane compressor and drive combination within a single casing connected to a combustion chamber.

U.S. Pat. No. 5,522,356 by Palmer (1996) presented an internal continuous combustion engine consisting of a radial vane compressor and radial vane drive mounted on the same shaft, with a combustion chamber connecting the two components.

U.S. Pat. No. 6,854,437 by Vazquez (2005) disclosed embodiments based on a radial compressor and drive with a combustion chamber positioned between them.

The compressor is not described in detail here, as it is part of other work, such as U.S. Pat. No. 11,959,479 by Alsubaih (2024) for a Radial Vane Rotary Compressor and application Ser. No. 18/432,079 by Alsubaih (2024) for a Rotary Radial Vane Compressor, or any other related work.

More recent advancements include U.S. Pat. No. 11,143, 098B1, which emphasizes mechanical torque generation in rotary internal combustion engines through innovative configurations.

Therefore, there is a need for an improved internal continuous combustion engine that overcomes the limitations and shortcomings of prior art designs. The present invention addresses this need by introducing a compact, integrated configuration featuring a unique pneumatic motor design, seamless compressor-motor integration, intermediate air and fuel storage tanks, and optimized exhaust gas discharge. These advancements collectively enhance engine efficiency, simplify operation and maintenance, and reduce the environmental impact associated with conventional internal combustion engines. By innovating upon existing continuous combustion engine technology, the present invention represents a significant step forward in the development of more sustainable, high-performance power generation solutions.

SUMMARY

This summary provided to introduce a selection of concepts, in a simplified format, that are further described in the detailed description of the invention. This summary neither intended to identify key or essential inventive concepts of the invention nor is it intended for determining the scope of the invention.

The present invention relates to the field of rotary expansible chamber devices and more specifically to an integrated engine block housing a compressor and a pneumatic motor for improved efficiency and space utilization.

In one aspect, the invention provides a rotary expansible chamber device comprising an integrated engine block housing a compressor and a pneumatic motor. The pneumatic motor includes a cylindrical casing with a pressurized gas inlet, an exhaust outlet, and an off-centre output shaft with an eccentrically mounted rotor. The rotor comprises a plurality of radial slots, each having a sliding vane with a spring on one side biasing the sliding vane outwardly and a sealing pivoted shoe on an opposite side configured to slidably engage the inner wall of the cylindrical casing. A combustion chamber is in fluid communication with the compressor and pneumatic motor. The pneumatic motor drives the compressor via the off-centre output shaft to supply compressed air to the combustion chamber.

In one embodiment, the sealing pivoted shoe comprises one of a hinged pivot and a profiled pivot configured to sealingly engage the inner wall of the cylindrical casing. The pneumatic motor further comprises a recess formed on the inner wall of the cylindrical casing, the recess extending from the exhaust outlet for gradual release of pressurized gases.

Advantageously, the device may further comprise an air tank in fluid communication with the compressor for storing compressed air, and a fuel pressure tank in fluid communication with the combustion chamber for storing pressurized fuel, wherein the air tank and the fuel pressure tank are configured to enable rapid starting of the device without a separate starter motor. The integrated engine block is configured to house the compressor and the pneumatic motor, while auxiliary components are positioned remotely from the integrated engine block for improved space utilization.

The device may also include a fuel pump for supplying fuel to the combustion chamber, a fuel injector for injecting the fuel into the combustion chamber, an air valve for controlling a flow of compressed air from an air tank to the combustion chamber, and a controller configured to regulate operation of the fuel pump, the fuel injector, and the air valve to optimize an air-fuel mixture for efficient combustion in the combustion chamber. The pneumatic motor is configured to operate as at least one of a compressor, a pump, and a meter for at least one of gases and liquids, and is a positive displacement, fully sealed radial vane rotary type motor.

In another aspect, the invention provides a rotary expansible chamber device comprising an integrated engine block housing a compressor and a pneumatic motor, where the pneumatic motor comprises a cylindrical casing with a pressurized gas inlet, an exhaust outlet, and a plurality of meshed radial vanes mounted on centrally located coaxial shafts forming a plurality of expansible chambers. The coaxial shafts extend through the cylindrical casing into an adjacent drive box, wherein, in the drive box, each coaxial shaft includes a radial crank with a bushing and slider/shaft joint at an end thereof, the slider/shaft joint slidably engaged within a corresponding radial slot formed on an off-centre flywheel, the off-centre flywheel including a plurality of equally spaced radial slots corresponding to the plurality of coaxial shafts. For each coaxial shaft, the radial crank, the slider/shaft joint, the corresponding radial slot, and the off-centre flywheel collectively form an inverted crank slider mechanism configured to coordinate motion of the meshed radial vanes with respect to each other within the cylindrical casing. A combustion chamber is in fluid communication with the compressor and the pneumatic motor, and the pneumatic motor is configured to drive the compressor via an output shaft to supply compressed air to the combustion chamber.

The foregoing and other features and advantages of the invention will be apparent from the following more particular description of preferred embodiments of the invention. The described embodiments solve problems associated with prior art and improve upon existing solutions by providing an integrated, efficient, and versatile rotary expansible chamber device.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 1: General view of the engine shown with aircraft propeller. It also show the remote auxiliary equipment.

FIG. 2: Vane rotary type motor block with remote auxiliary equipment, front and back views.

FIG. 3: Vane rotary type motor, assembly view of the pneumatic motor with three vanes showing all internal parts.

FIG. 4: Vane embodiments for rotary type motor a) hinged shoe and b) profiled pivoted shoe.

FIG. 5: Vane rotary type motor, engine operation view with three vanes.

FIG. 6: Vane rotary type motor casing showing the gradual discharge recess near the exhaust port, vane drawn transparent to show recess in the casing inner wall.

FIG. 7: Vane rotary type motor, operation view with four vanes in two progressive positions.

FIG. 8: coaxial radial vane type engine, a) front side view b) back side view.

FIG. 9: coaxial radial vane type motor, assembly view with four vanes.

FIG. 10: coaxial radial vane type motor showing single vane with inverted crank slider mechanism, a) isolated single vane with slider/shaft joint b) equivalent schematic drawing of the inverted crank slider mechanism.

FIG. 11: coaxial radial vane type motor gradual discharge recess near the exhaust port. Vane drawn transparent.

FIG. 12: coaxial radial vane type motor with labyrinth no-contact seal clearance with the casing.

FIG. 13: coaxial radial vane type motor, operation view with four vanes in three progressive positions.

DETAILED DESCRIPTION

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description provided as illustrative of the principles of the present disclosure and not in limitation thereof.

The terms "a" and "an" and "the" and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

All systems described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to "an element" can include two or more such elements unless the context indicates otherwise.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might", or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

FIG. 1 depicts a rotary expansible chamber device with an integrated engine block 1 casing a compressor 3 and a pneumatic motor 2 in a compact configuration. The engine block 1 integrates the pneumatic motor 2 and compressor 3, with auxiliary components 5 such as an air tank 6, fuel pump 7, and fuel pressure tank 8 positioned remotely and connected via hoses, pipes and wires 9. A combustion chamber 4 has a pressurized air input port 31, a fuel injector 32 and an ignition device 11 and is in fluid communication with the compressor 3 and the pneumatic motor 2, mounted on the pneumatic motor casing at the pressurized gas inlet 12, with exhaust outlet 13 located on the opposite side.

FIG. 2 provides front and back perspective views of the integrated engine block 1, clearly showing the pneumatic motor 2 and compressor 3 combined into a single unit. The pneumatic motor 2 comprises a cylindrical casing 20 with the pressurized gas inlet 12 and the exhaust outlet 13.

FIG. 3 presents an assembly view of the rotary expansible chamber device embodiment, revealing the internal components. The cylindrical casing 20 has an off-center output shaft opening 30 with a rotor 23 mounted thereon. The rotor 23 includes a plurality of slots 24, each slot 24 having a sliding vane 21 with a spring 25 on one side pushing the vane outward and a sealing pivoted shoe 22 on the other side configured to slide against an inner wall of the cylindrical casing 20. An output shaft 10 connects the rotor 23 to the compressor 3, allowing the pneumatic motor 2 to drive the compressor 3 to supply compressed air to the combustion chamber 4.

In one embodiment, the device comprises an integrated engine block casing a compressor 3 and a pneumatic motor 2. Said pneumatic motor 2 includes a cylindrical casing 20 with a pressurized gas inlet 12 and an exhaust outlet 13. As shown in FIG. 6, the exhaust outlet 13 features a recess 14 disposed along the cylindrical casing 20 wall, configured to enable gradual release of pressurized gases, thereby eliminating the need for a bulky muffler.

The cylindrical casing 20 has an off-center output shaft 10 with a rotor 23 mounted thereon. Said off-center output shaft 10 mounted through the block, connecting the pneumatic motor rotor 23 to the compressor 3. It drives the compressor and any auxiliary equipment on one end while delivering mechanical work output on the other. Rotor 23, affixed to shaft 10, contains three or more offset slots 24, each slot 24 accommodating a sliding vane 21.

The sliding vanes 21 are equipped with sealing pivoted shoes 22 at their ends, pivoted or hinged to maintain sealing contact with the inner wall of the cylindrical casing 20. Springs 25 configured to apply outward force to the sealing pivoted shoes 22 against the cylindrical casing 20. A cover 28 is disposed on the cylindrical casing 20 to seal the internal moving parts within, while allowing sufficient clearance for unimpeded motion. Said sliding vanes 21, cylindrical casing 20, and cover 28 constructed from or lined with materials capable of withstanding high temperatures and pressures.

In operation, pressurized gas enters through the pressurized gas inlet 12 into the expansible chambers formed between the sliding vanes 21, rotor 23, and cylindrical casing 20. As the gas expands, it imparts rotational force on the vanes, causing the rotor 23 and subsequently the output shaft 10 to rotate. The expanding gas then released through exhaust outlet 13. The rotary motion of output shaft 10 provides mechanical power output to drive the compressor 3 and any connected equipment.

The device includes a combustion chamber 4 in fluid communication with the compressor 3 and the pneumatic motor 2. In one embodiment, the working fluid that drives the pneumatic motor 2 is pressurized hot gases generated from the continuous combustion process within said combustion chamber 4. As these high-pressure, high-temperature gases enter the motor through the pressurized gas inlet 12, they fill the expansible chambers formed between the sliding vanes 21, rotor 23, and cylindrical casing 20. The pressurized combustion gases thereby imparts a strong rotational force on the sliding vanes 21, causing the rotor 23 and output shaft 10 to rotate.

The combustion chamber 4 designed to withstand high pressure and temperature conditions. It features a pressurized air input port 32, a fuel injector 32, and an ignition device 11 such as a spark plug. Air and fuel fed into the chamber at a controlled rate, and the ignition device 11 initiates continuous combustion. This process generates a steady supply of high-pressure, high-temperature gases that are directed to the pneumatic motor 2 via the pressurized gas inlet 12. The interior of the combustion chamber 4 may be made or lined with ceramics or other materials capable of withstanding high temperatures. As the hot pressurized gases enter the expansible chambers formed by the sliding vanes 21, rotor 23, and cylindrical casing 20, they impart rotational force on the vanes, causing the rotor 23 and output shaft 10 to rotate. This rotational work is then harnessed to drive the compressor 3 and any connected equipment, while the expanded gases are released through the exhaust outlet 13.

As depicted in FIG. 6, the exhaust outlet 13 features a recess 14 disposed along the inner wall of the cylindrical casing 20. This unique design allows for the gradual (extended) release and expansion of exhaust gases as they exit the motor. By providing a more controlled and progressive exhaust process, this feature is configured to significantly reduce noise output without the need for a separate, bulky muffler.

In one embodiment, the off-center positioning of the output shaft opening 30 within the cylindrical casing 20 is a key aspect of the motor's design. This asymmetric layout allows for the formation of larger expansible chambers on one side of the rotor 23 compared to a centered shaft design. As such, the expanding gases can thereby exert a greater rotational force on the sliding vanes 21, resulting in improved torque output and efficiency.

The pneumatic motor typically incorporates three or more sliding vanes 21. Increasing the number of vanes 21 can provide smoother operation and more consistent torque output, as the expanding gases are distributed more evenly around the rotor 23. The present invention, as shown in FIG. 3, displays a three-vane configuration, offering a balance between simplicity and performance.

To maintain the integrity of the expansible chambers, each sliding vane 21 is equipped with a sealing pivoted shoe 22 coupled to its tip. Said sealing pivoted shoes 22 are pivoted or hinged to allow them to adjust their angle and maintain sealing contact with the inner wall of the cylindrical casing 20 throughout the rotor's 23 rotation. Springs 25 configured to provide the necessary force to push the sealing pivoted shoes 22 outward, thereby ensuring a tight seal between the sliding vanes 21 and the cylindrical casing wall 20.

Given the high temperatures generated by the continuous combustion process, the device comprises a cooling system (not shown) to manage heat levels. This may include coolant passages disposed within the cylindrical casing 20, as well as external heat exchangers connected to the passages to dissipate excess heat. The use of high-temperature materials, such as ceramics or specialized alloys, for the combustion chamber 4, sliding vanes 21, and cylindrical casing 20 further enhances the device's ability to withstand extreme thermal stress.

Precise control over the combustion process is essential for optimum device performance. This is achieved through careful regulation of air and fuel flow rates. The air flow control valve (not shown) and fuel flow control valve (not shown) are configured to work in concert to maintain the ideal air-fuel mixture ratio, while the ignition system, such as a ignition device 11, is configured to initiate combustion at the appropriate moment.

According to another embodiment, the pneumatic motor 2 is a positive displacement, fully sealed radial vane rotary type motor. This configuration ensures efficient and reliable operation, as the fully sealed design prevents leakage and maintains optimal pressure within the expansible chambers formed between the radial vanes 21, rotor 23, and cylindrical casing 20. The positive displacement characteristic of the motor allows for precise control over the flow of pressurized gas, thereby enhancing the overall performance and efficiency of the rotary expansible chamber device.

FIG. 4 provides a detailed view of two embodiments of the vanes 21 and their respective sealing shoes 22. In one embodiment, the sealing shoe 22 is coupled to the vane 21 via a sealed hinged pivot 27*a*. Said hinged pivot fabricated using high-precision machining techniques, such as die sinking EDM and wire EDM or equivalent methods, to create a sealed hinge 27*a* with pin 26. In another embodiment, the sealing shoe 22 connected to the sliding vane 21 through a profiled pivot, comprising a sealed fit 27*b*. The profiled pivot likewise manufactured using ultra-accurate machining processes, such as wire EDM or equivalent techniques.

The operation of the rotary, expansible chamber engine is as follows. With reference to FIG. 5, to start the engine, a controlled minimum quantities of air and fuel released into the combustion chamber 4, and ignition triggered by a spark from the ignition device 11, all under proper control and safety measures. The continuous combustion process generates high-pressure hot gases, which are directed into the pressurized gas inlet 12. Said gases positively drive the pneumatic motor 2 in a clockwise (CW) direction, as per the design shown. Consequently, the motor 2 drives the compressor 3 and produces mechanical work via output shaft 10. The combustion gases then gradually exit through the exhaust outlet 13, passing through the recess extension 14, as depicted in FIG. 6.

FIG. 5 illustrates a typical operating state of the motor 2. Pressurized combustion gases enter through port 12 into zone I, pushing vane (a) in the clockwise direction. Vane (b) has already swept through zone II, and exhaust is about to commence at the recess 14. Zone III already been exhausted. While the motor can function with only two vanes, it may encounter singularity positions where the motor will be in a locked or bypass state, necessitating a starter motor to propel the vanes out of the singularity position. To overcome this issue, three vanes employed, eliminating any singularity positions and ensuring operation whenever pressurized gases are supplied at the pressurized gas inlet 12. In some embodiments, a four-vane design utilized, allowing work to be harvested from both the pressurized gas flow and the expansion of the trapped gases in the power chamber.

To further elucidate, the operation of the four-vane configuration, FIG. 7 depicts two consecutive positions of the vanes during operation. In position A, the pressurized gases enter chamber I, pushing vane (a) in the clockwise direction, while chamber II (referred to as the power chamber) contains a trapped volume of pressurized gases. Said trapped gases exert outward forces on the bounding vanes, proportional to the exposed vane area, tending to rotate the rotor 23 clockwise and increase the chamber volume. As the power chamber reaches its maximum volume in position B, the pressure of the trapped gases decreases, and exhaust begins through the slot recess 14 and out through exhaust outlet 13. This process harnesses additional work, enhancing overall efficiency. In some embodiments, the motor may require lubrication that can withstand high temperatures.

In one embodiment, the rotary expansible chamber device includes an air tank 6 in fluid communication with the compressor 3 for storing pressurized air. The air tank 6 connected to the compressor 3 via hoses or pipes 9, allowing compressed air to be stored for operation and start up without a starter motor. Additionally, a fuel pressure tank 8 provided for storing pressurized fuel. The fuel pressure tank 8 is also connected to the device through hoses or pipes 9. The air tank 6 and fuel pressure tank 8 configured to enable rapid starting of the device without the need for a separate starter motor. By having a ready supply of pressurized air and fuel, the combustion process can be initiated quickly, allowing the device to start and reach optimal operating conditions in a short period of time.

The device further comprises a fuel pump 7 for supplying fuel to the combustion chamber 4. The fuel pump 7 is responsible for delivering the required amount of fuel from the fuel pressure tank 8 to the combustion chamber 4. A fuel injector 32 used for injecting the fuel into the combustion chamber 4 in a controlled and precise manner. The fuel injector 32 atomizes the fuel into fine droplets, ensuring efficient mixing with the compressed air from the compressor 3.

An air valve 15 provided for controlling the flow of compressed air from the air tank 6 to the combustion chamber 4. The air valve 15 regulates the amount of air entering the combustion chamber 4, allowing optimal air-fuel ratios to be maintained. By adjusting the air valve 15, the device can adapt to varying operating conditions and load requirements.

To ensure efficient and reliable operation, the device includes a controller 16. The controller 16 configured to regulate the operation of the fuel pump 7, fuel injector 32, and air valve 15. It continuously monitors various parameters such as air pressure, fuel pressure, and combustion chamber temperature, making real-time adjustments to optimize the air-fuel mixture for efficient combustion. The controller 16 may also incorporate safety features, such as automatic shutdown in case of any abnormal conditions or malfunctions.

The integration of the air tank 6, fuel pressure tank 8, fuel pump 7, fuel injector 32, air valve 15, and controller 16 enables the rotary expansible chamber device to operate with high efficiency and reliability. The rapid starting capability provided by the air tank 6 and fuel pressure tank 8 enhances the versatility of the device, making it suitable for applications where quick response times are essential. The precise control over the air-fuel mixture, facilitated by the controller 16, ensures optimal combustion conditions, resulting in improved performance and reduced emissions.

As shown in FIG. 8 and FIG. 9, various views of another embodiment of the coaxial radial vane type pneumatic motor embodiment are illustrated. The motor primarily comprises an engine block 100, wherein said engine block 100 includes a cylindrical casing 101, a drive mechanism box 102, a compressor 103, and a cover 120. The cylindrical casing 101 features a pressurized gas inlet 104 configured for the entry of high-pressure combustion gases, and an exhaust outlet 105 with a gradual discharge slot recess 106, as depicted in FIG. 11.

With reference to the cylindrical casing 101, in one embodiment it has three or more coaxial shafts 107 that centrally extend from the cylindrical casing 101 into the drive box 102. Each shaft 107 is equipped with one radial vane 108 disposed on the motor casing side, and a crank arm 109 on the drive mechanism box side 102. The radial vanes 108 and the coaxial shafts 107 configured to mesh, thereby forming three or more independent sealed chambers 110 that serve as the working chambers for the rotary, expansible chamber device.

In this embodiment, the drive side features cranks 109, each crank 109 has a bushing disposed at its end, with slider/shaft joint 112 mounted on it. The slider/shaft joint slider side 112 slide within three or more equally spaced radial slots 113 cut on an off-center flywheel 115, as illustrated in FIG. 10. Each off-center radial slot 113 and crank 109 form an inverted crank slider mechanism with a variable cyclic angular ratio, as shown in FIG. 10B. As all the radial slots 113 are disposed on the same flywheel 115, the angular speed of each sliding vane 108 coupled to the others. Consequently, each sliding vane 108 cyclically drives and be driven by the other vanes, depending on its location relative to the power zone 111, as depicted in FIG. 13.

In one embodiment, for a three-vane configuration, the radial slots 113 are positioned 120 degrees with respect to each other. Similarly, in another embodiment, for a four-vane configuration, the slots 113 are positioned 90 degrees apart. This arrangement causes the angular ratio between the leading vane and the lagging vane to change cyclically. The device is configured such that the angular velocity of the leading vane is higher during the power zone range 111 (FIG. 13), ensuring that pressure drives the vanes in a clockwise (CW) direction, according to the orientation shown. The flywheel 115 has an output shaft 121 configured to drive the compressor 103 and deliver the engine work.

For any chamber in the power zone 111 (FIG. 13), the angular velocity ratio of the leading vane with respect to the lagging vane is greater than one. As such, the pressure tends to rotate both, the leading and lagging vanes, in the clockwise direction. The leading vane rotates faster (CW), while the lagging vane rotates slower (CW). By the time the lagging vane reaches the power zone, the ratio gradually changes to exceed one, thereby causing it to become the leading vane with respect to its lagging vane.

While a three-vane configuration is functional, it may not be as efficient since it only harvests work from the flow of gases. Configurations with four or more vanes offer improved efficiency, as they harvest work from both the flow of gases and the expansion of trapped pressurized gases, wherein said operation will be further explained in the operation section below.

To enhance efficiency and minimize pressure leaks during operation, high-temperature-resistant oil may be used. Additionally, a labyrinth sealing feature 122 (FIG. 12) can be utilized, wherein said labyrinth sealing feature 122 is designed and manufactured with minimum no-contact sealing clearance.

With reference to FIG. 13, the operation of the four vanes rotary expansible chamber device illustrated in three successive positions (A), (B), and (C). As shown in FIG. 13, the motor comprises a casing 101 with an inlet port 104, an exhaust outlet 105, and an exhaust slot recess 106. Disposed within said casing 101, a coaxial shaft 107 centrally positioned, consisting of four meshed vanes 108 coupled to a flywheel 115 via an inverted crank slider mechanism housed in drive box 102 (depicted in dashed lines).

In position (A), the flywheel slots 113 are disposed at a 45-degree angle relative to the off-center line 114. At this position, chambers I and III have equal volumes, while chamber II is at its maximum volume and chamber IV is at its minimum volume. Chamber I is driven by the inflow of pressurized gases, chamber II is fully expanded with lower gas pressure and is about to commence gradual exhaust through said exhaust slot recess 106. Chamber III is in the exhaust state. After a few degrees of rotation, at position (B), vane (a) has just become the leading vane, and chamber IV has transitioned into the power chamber driven by the inflow of pressurized gases. Chamber I has just trapped a specific quantity of pressurized gases and will continue to extract work as it expands until reaching said exhaust slot recess 106 at a lower pressure. At position (C), which is 90 degrees from said off-center line 114, chamber IV driven by the inflow of gases, chamber I driven by the expansion of the trapped pressurized gases, while chambers II and III are in the exhaust state.

As depicted in FIG. 10, said vanes 108 interconnected through the inverted crank slider mechanism and flywheel 115 located within said drive box 102. The power zone 111 commences at point X, wherein vane (a) (FIG. 13A) begins to rotate faster than vane (d) in the clockwise direction. The power zone concludes at point Y, wherein chamber II (FIG. 13A) reaches its maximum volume, and gradual exhaust is about to start at vane (c) (FIG. 13A) through said exhaust slot recess 106 and ultimately through said exhaust outlet 105. As a vane enters said power zone 111, it becomes the leading vane, exhibiting a higher angular velocity than the lagging vane, while all vanes rotate in the same clockwise direction but with varying angular velocities. When the pressurized gases enter said inlet port 104 into chamber I (FIG. 13A), it induces a clockwise rotation of the motor due to the constant pressure gas flow, thereby extracting work from the constant pressure gas flow. A few degrees later, as shown in FIG. 13B, chamber I traps a specific amount of pressurized gases. The trapped pressurized gases apply equal force on the leading and lagging vanes in opposite directions. However, since the leading vane has a higher angular velocity ratio relative to the lagging vane, the chamber expands while rotating clockwise, causing a reduction in pressure in chamber I until reaching its maximum volume, as depicted in chamber II of FIG. 13A. This expansion of the chamber volume extracts additional work from the trapped pressurized gases. Upon reaching the maximum volume in chamber II (FIG. 13A) at the end of said power zone Y, the gases gradually escape, starting from the tip of vane (c) (FIG. 13A), through said exhaust slot recess 106, and eventually out through said exhaust outlet 105. All other chambers follow the same pattern. The expansion ratio from the trapped volume (chamber I, FIG. 13B) to the maximum volume (chamber II, FIG. 13A) directly influences the motor's efficiency. The design parameters that allow for optimizing the efficiency include the vane thickness, the distance of said off-center line 114, and the crank arm length 109.

In some embodiments (not shown), the rotary expansible chamber device further comprises a fuel system to enable the use of liquid or gaseous fuels. The fuel system includes a fuel pump that delivers fuel from a fuel tank to a plurality of fuel injectors 31. The fuel injectors 31 are in fluid communication with the combustion chambers and configured to inject fuel directly into said combustion chambers at precise rate. A controller provided to control the operation of the fuel pump and fuel injectors 31. The controller receives various sensor inputs, such as engine speed, load, and temperature, and adjusts the fuel injection rate accordingly to optimize engine performance and efficiency.

In another embodiment, the rotary expansible chamber device includes features to enable quick starting without the need for a starter motor. An air tank provided in fluid communication with the compressor. The air tank stores compressed air generated by the compressor during the operation of the device. Additionally, a fuel pressure tank is included, which is in fluid communication with the combustion chambers. The fuel pressure tank stores pressurized fuel delivered by the fuel pump. When the device is to be started, a specific amount of pressurized air and fuel released into the combustion chamber, ignited with the ignition device to produce high-pressure combustion gases to drive the motor. This will eliminate the need for a separate starter motor. This quick-start feature is particularly useful in applications where frequent starting and stopping of the device is required, such as in hybrid vehicles, cars with "stop/start" feature or portable power units.

Operational Flow of Radial Vane Rotary Type Pneumatic Motor

The process begins with air and fuel released into the combustion chamber 4 in minimum quantities to ensure an optimal mixture for ignition. Next, a spark from the ignition device 11 initiates ignition within the chamber, starting the combustion process.

The combustion releases continuous high-pressure hot gases into the intake port 12 of the pneumatic motor 2. The high-pressure gases enter the pneumatic motor 2 and positively drive it in a clockwise direction, initiating rotor movement. Pressurized gases enter the intake port 12 and push the vanes 21, which facilitate rotational action.

The vanes 21 are sealed against the casing wall by pivoted shoes 22 and springs 25, maintaining internal pressure. As the rotor 23 rotates, the vanes 21 slide within the rotor slots, enabling effective gas expansion. The chambers between the vanes expand and contract as the rotor rotate during operation.

The expanding gases in the power chamber contribute additional work, enhancing overall efficiency. Gases exit through the exhaust port 13 and the gradual discharge slot recess 14, completing the cycle. The rotating motion of the pneumatic motor 2 is transferred to the output shaft 10.

The output shaft 10 drives the compressor 3, providing mechanical work to various applications. The compressor 3 supplies compressed air back to the combustion chamber 4, sustaining continuous combustion. This process continues as long as fuel and air are supplied to the combustion chamber 4, driving the pneumatic motor 2 effectively.

Operational Flow of an Embodiment of Coaxial Radial Vane Type Pneumatic Motor The process begins with air and fuel released into the combustion chamber 4 in minimum quantities, ensuring an optimal mixture for ignition. A spark from the ignition device 11 initiates ignition within the combustion chamber, starting the combustion process.

The continuous combustion releases continuous high-pressure hot gases into the intake port 104 of the pneumatic motor. The high-pressure gases enter the pneumatic motor and positively drive it in a clockwise direction, initiating coaxial shafts movement. Pressurized gases enter the inlet port 104 and push the meshed radial vanes 108, which facilitate rotational action.

Each vane 108 is connected to a coaxial shaft 107 and a crank arm (109) in the drive mechanism box 102. Crank arms 109 connect to slider/shaft joints 112 that slide within radial slots 113 on an off-center flywheel 115.

As the gases push the vanes 108, this inverted crank slider mechanism allows for rotation at differing angular velocities. The leading vane rotates faster than the lagging vane during the power zone, enhancing torque. The expanding gases in the power chamber continue to add work, improving overall efficiency.

Gases exit through the exhaust port 105 and the gradual discharge slot recess 106, completing the cycle. The rotating motion of the pneumatic motor transferred to the output shaft 121. The output shaft 121 drives the compressor 3, providing mechanical work to various applications.

The compressor 103 supplies compressed air back to the combustion chamber 110, thus sustaining combustion. This process continues as long as fuel and air are supplied to the combustion chamber 110, effectively driving the pneumatic motor.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

The invention claimed is:

1. A rotary expansible chamber device, comprising:

a. an integrated engine block housing a compressor and a pneumatic motor;

b. the pneumatic motor comprising a cylindrical casing with a pressurized gas inlet and an exhaust outlet, the cylindrical casing having an off-center output shaft with a rotor eccentrically mounted thereon, the rotor including a plurality of radial slots, each radial slot having a sliding vane with a spring on one side biasing the sliding vane outwardly and a sealing pivoted shoe on an opposite side configured to slidably engage an inner wall of the cylindrical casing;

c. a combustion chamber in fluid communication with the compressor and the pneumatic motor; and d. wherein the pneumatic motor is configured to drive the compressor via the off-center output shaft to supply compressed air to the combustion chamber.

2. The rotary expansible chamber device of claim 1, wherein the sealing pivoted shoe comprises one of a hinged pivot and a profiled pivot configured to sealingly engage the inner wall of the cylindrical casing.

3. The rotary expansible chamber device of claim 1, wherein the pneumatic motor further comprises a recess formed on the inner wall of the cylindrical casing, the recess extending from the exhaust outlet for gradual release of pressurized gases.

4. The rotary expansible chamber device of claim 1, further comprising: a. an air tank in fluid communication with the compressor for storing compressed air; and b. a fuel pressure tank in fluid communication with the combustion chamber for storing pressurized fuel; c. wherein the air tank and the fuel pressure tank are configured to enable rapid starting of the device without a separate starter motor.

5. The rotary expansible chamber device of claim 1, wherein the integrated engine block is configured to house the compressor and the pneumatic motor, while auxiliary components are positioned remotely from the integrated engine block for improved space utilization.

6. The rotary expansible chamber device of claim 1, further comprising:

a. a fuel pump for supplying fuel to the combustion chamber;

b. a fuel injector for injecting the fuel into the combustion chamber;

c. an air valve for controlling a flow of compressed air from an air tank to the combustion chamber; and d. a controller configured to regulate operation of the fuel pump, the fuel injector, and the air valve to optimize an air-fuel mixture for efficient combustion in the combustion chamber.

7. The rotary expansible chamber device of claim 1, wherein the pneumatic motor is configured to operate as at least one of a compressor, a pump, and a meter for at least one of gases and liquids.

8. The rotary expansible chamber device of claim 1, wherein the pneumatic motor is a positive displacement, fully sealed radial vane rotary type motor.

* * * * *